Aug. 19, 1941. G. F. FORSTHOEFEL ET AL 2,253,482
ICE CREAM VENDING MACHINE
Filed April 25, 1940 5 Sheets-Sheet 1

INVENTORS
Gregg F. Forsthoefel
Howard D. White
BY Albert R. Henry
ATTORNEY

Aug. 19, 1941.  G. F. FORSTHOEFEL ET AL  2,253,482
ICE CREAM VENDING MACHINE
Filed April 25, 1940   5 Sheets-Sheet 2
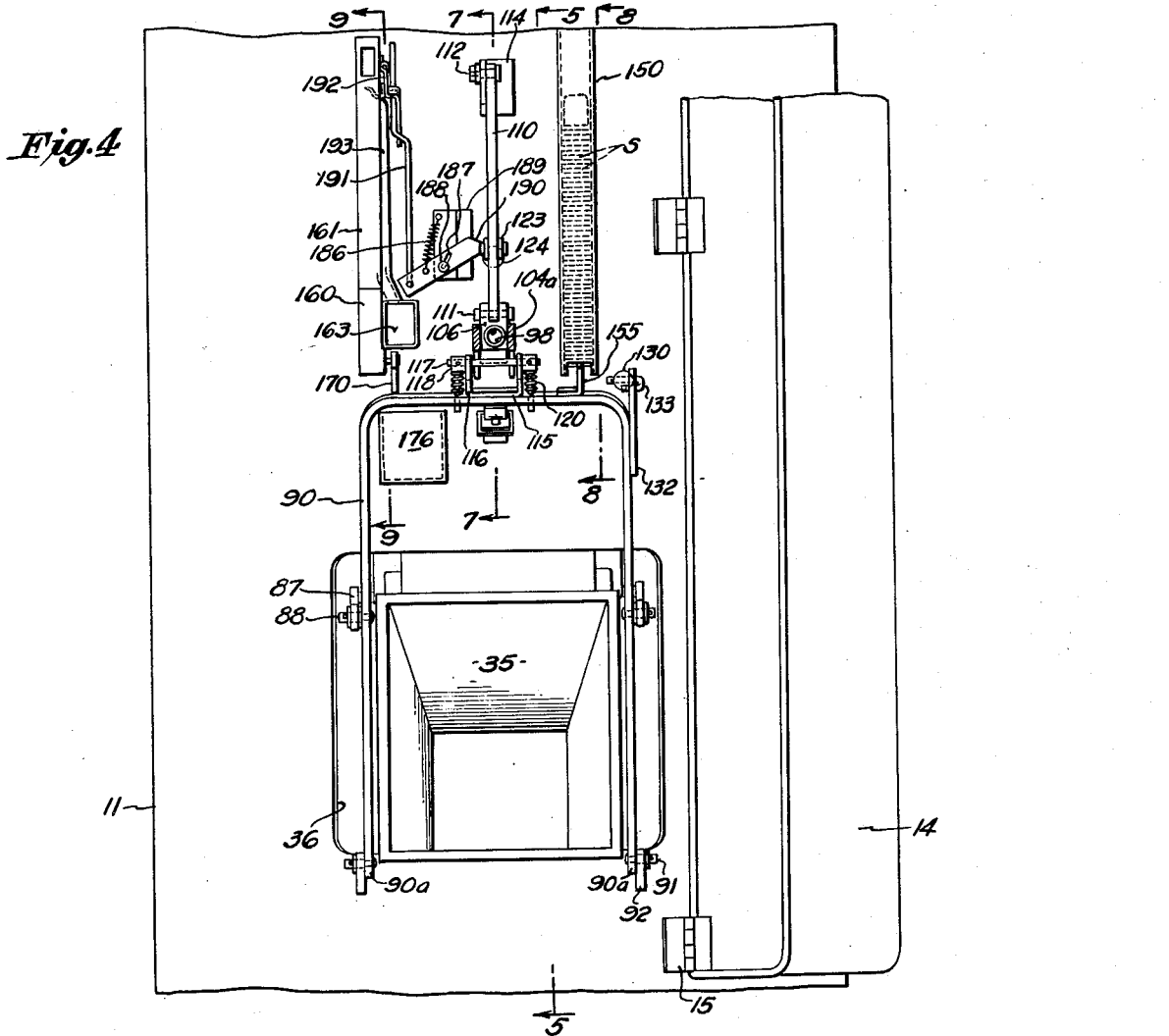
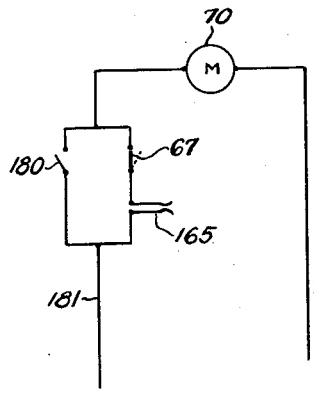
INVENTORS
Gregg F. Forsthoefel
Howard D. White
BY Albert R. Henry
ATTORNEY Aug. 19, 1941.　　G. F. FORSTHOEFEL ET AL　　2,253,482
ICE CREAM VENDING MACHINE
Filed April 25, 1940　　5 Sheets-Sheet 3
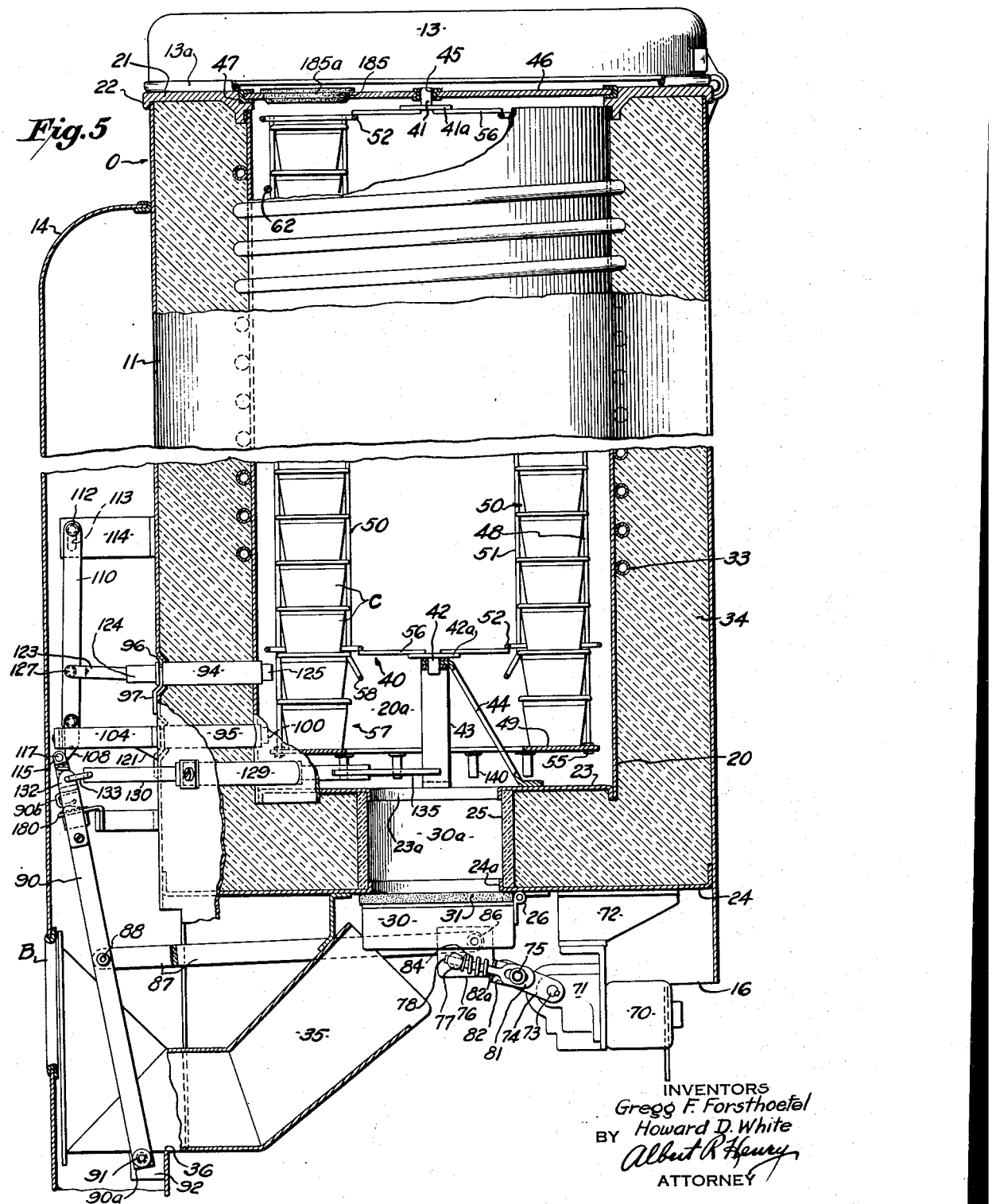
INVENTORS
Gregg F. Forsthoefel
Howard D. White
BY Albert R. Henry
ATTORNEY Aug. 19, 1941.  G. F. FORSTHOEFEL ET AL  2,253,482
ICE CREAM VENDING MACHINE
Filed April 25, 1940  5 Sheets-Sheet 4

INVENTORS
Gregg F. Forsthoefel
Howard D. White
BY Albert R. Henry
ATTORNEY

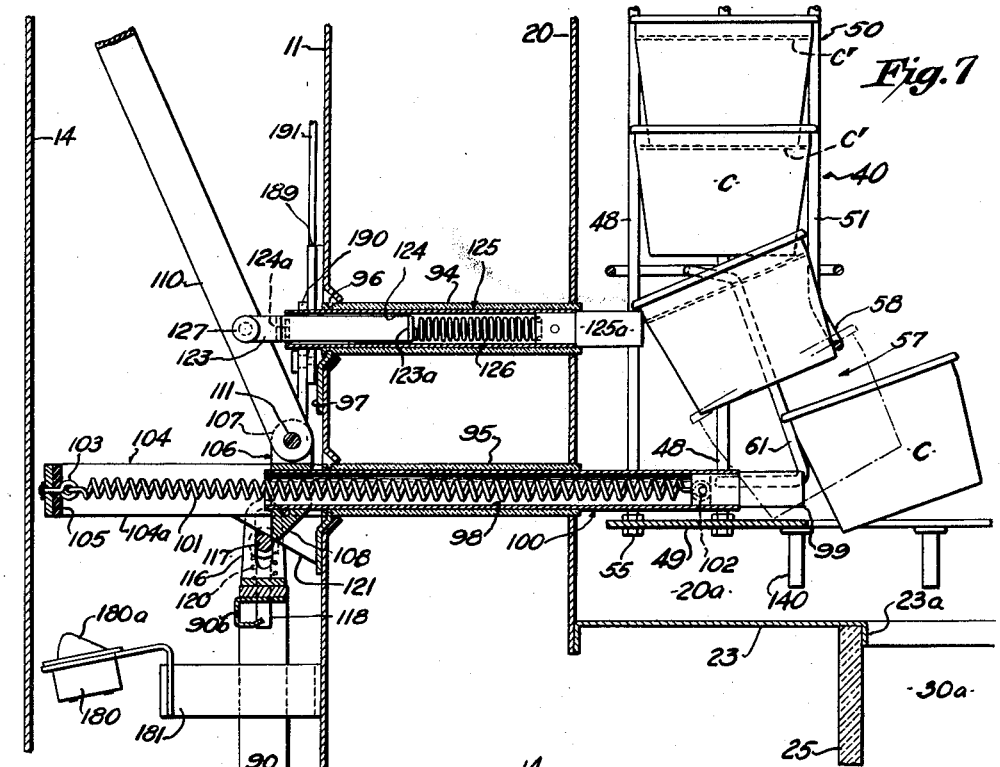
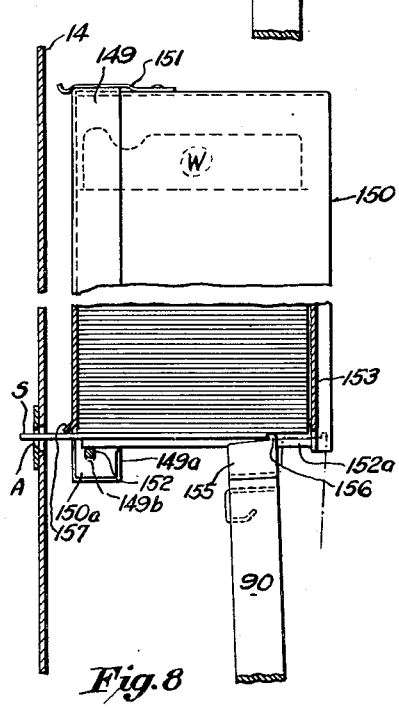
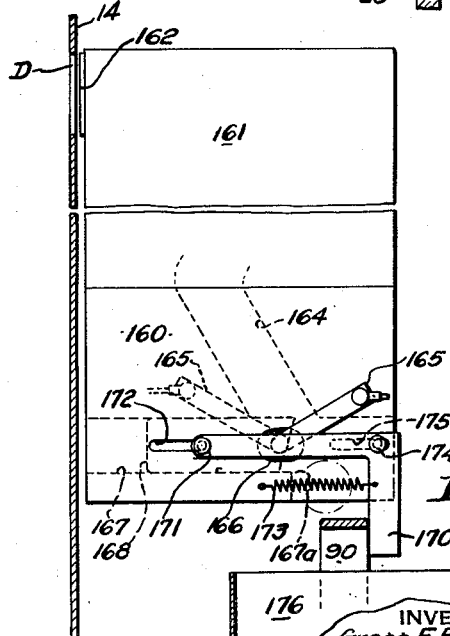

Patented Aug. 19, 1941

2,253,482

UNITED STATES PATENT OFFICE 2,253,482

ICE CREAM VENDING MACHINE

Gregg F. Forsthoefel and Howard D. White, Adrian, Mich., assignors to Revco, Inc., Adrian, Mich.

Application April 25, 1940, Serial No. 331,626

13 Claims. (Cl. 312—36)

This invention relates to coin-controlled vending machines of a type suited for the dispensing of frozen packaged comestibles.

The invention is devised with a view to effectiveness and simplicity of the dispensing mechanism and an associated refrigeration system. In the dispensing mechanism, a novel ejector device is provided, which cooperates with a specially formed magazine structure in dispensing the packages in controlled order and with a minimum of violence. This permits the more difficult forms of packages, for example the usual ice cream cups, to be dispensed without the danger of damage thereto, and the resultant injury of the mechanism. The mechanism may be organized with a coin-controlled instrumentality, so that the machine may be installed in a public place for automatic dispensing operation.

The packages or cups are carried in stacked relation in a rotary magazine structure which is housed in a closed refrigerated chamber of a specially formed cabinet. The cups are ejected from the magazine toward the center of the chamber, where they fall through an opening and into a chute leading out of the cabinet. The central opening in the chamber is closed by a door which is temporarily opened by the mechanism to permit the escape of a cup, and then quickly closed. This arrangement permits the refrigerated chamber to be sealed during inactive periods, and it prevents the escape of cold air and the corresponding economic maintenance of low temperatures in the storage chamber.

Other features of the invention include an automatic spoon feed, and various control and safety devices which are more specifically set forth in the accompanying specification and drawings, wherein:

Figs. 1, 2, and 3 are side, front, and top views, respectively, of the machine;

Fig. 4 is a fragmentary front view with the door in open position;

Fig. 5 is an enlarged section on the line 5—5 of Fig. 4 with portions shown in elevation;

Fig. 7 is an enlarged fragmentary section on the line 7—7 of Fig. 4, showing the cup-expelling mechanism in detail;

Fig. 8 is an enlarged fragmentary section on the line 8—8 of Fig. 4, showing particularly the spoon feed mechanism;

Fig. 9 is an enlarged fragmentary section on the line 9—9 of Fig. 4, showing the coin-controlled units;

Fig. 10 is a diagrammatic view showing the electric circuit of the control instrumentalities;

Figure 2:
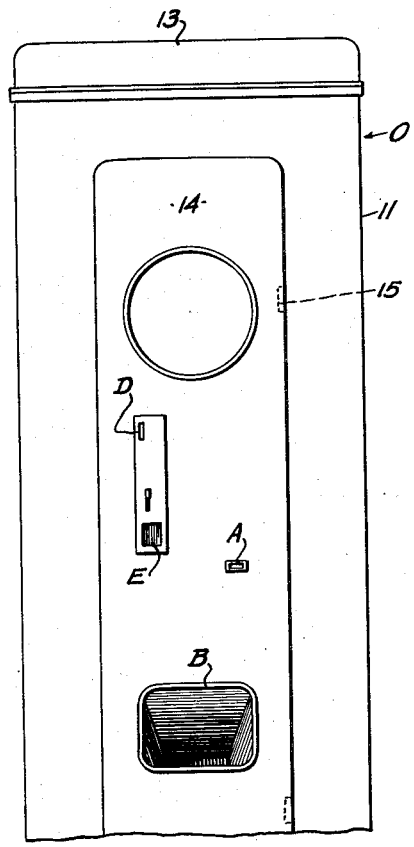
Figure 1:
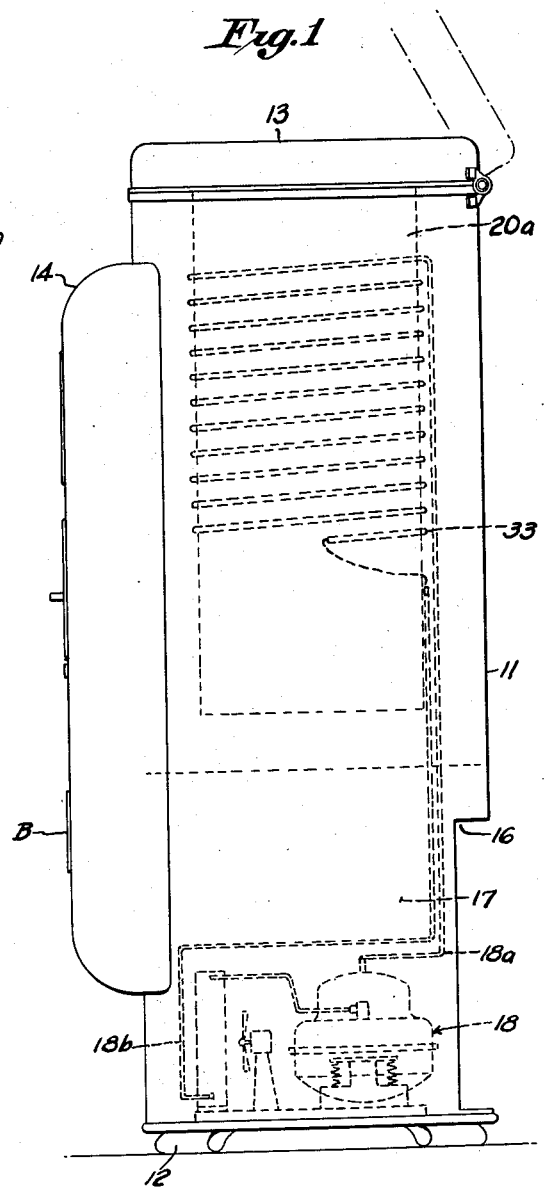
Figure 3:
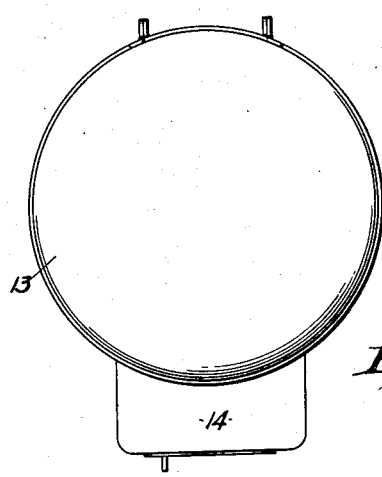

The machine is organized with a cabinet O, whose outer casing 11 is cylindrical in shape and provided with supporting feet 12. As generally shown in Fig. 1, the cabinet is provided with an insulated cover 13 which is hinged to afford access to the interior of the cabinet when it is necessary to insert a supply of cups containing ice cream or other comestible. The cover is provided with a resilient gasket member 13a which seals the inner compartment. A closure 14, carried by hinges 15 on the casing 11, is formed to provide a housing, which in its closed position conceals a part of the mechanism of the device. The lower rear portion of the casing 11 contains an opening 16 leading into a chamber 17, wherein is housed a high-side unit 18 of a refrigeration system, having suction and pressure lines 18a and 18b respectively.

The closure 14 is formed with a slot D, through which a coin may be inserted to initiate a dispensing operation during which the machine delivers a spoon and a cup, which may be removed from the machine through windows A and B, respectively, in the face of the closure 14. In the event that the machine is empty, or a faulty coin is inserted, the inserted coin is returned where it is available through a return window E.

Figure 6:
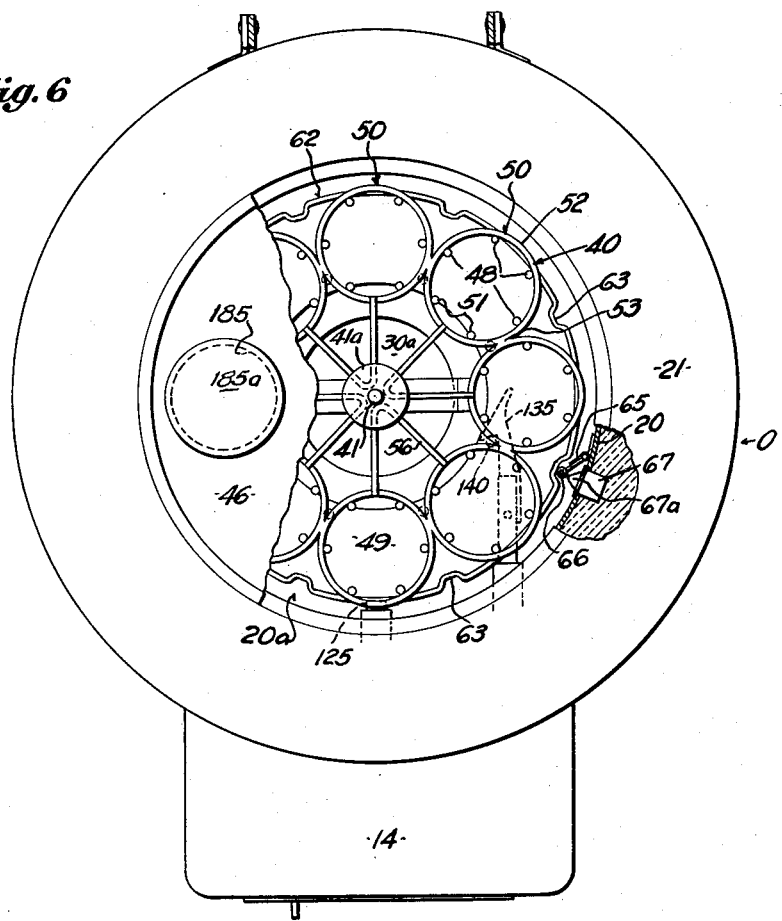
Fig. 6 is an enlarged top view, with the top cover removed and portions broken away to show the underlying structure.

In Figs. 5 and 6, it will be seen that the cabinet O is provided with an inner cylindrical casing or shell 20, which at its upper and open end is fastened to an annular plate 21 of insulating material. The plate 21 is formed with a peripheral flange 22 which overlies the edge of the outer casing 11. A flanged bottom plate 23 is secured within the lower confines of the inner casing, and it contains a flanged central opening 23a. A circular plate 24 is secured within the outer casing 11 in spaced relation to the plate 23, and it is formed with a central flanged opening 24a. A cylindrical member 25, formed of insulating material, is disposed between the plates 23 and 24, and it is fitted exteriorly of the flanged openings 23a, 24a thereof. Hinges 26, secured to the bottom of the plate 24, carry a door 30, which normally covers the central passage 30a formed by the cylindrical member 25 and the associated openings in the plates 23 and 24. The door 30 is preferably formed of an insulating material including a soft rubber pad 31, which may be tightly pressed against the lip of the flanged opening 24a.

The inner shell 20 receives a helically wound refrigeration tube 33, which is subsequently soldered thereto to provide a good thermal connection. The tube 33 is suitably connected to the suction and pressure lines 18a, 18b of the refrigeration unit 18, to provide the evaporative portion of the system, as is well known in the art. The refrigerated storage chamber 20a which is thus formed within the inner casing 20, is protected against heat ingress by packing the space between the casings with an insulating material, as indicated by the numeral 34.

An inclined delivery chute 35 is positioned beneath the door 30, and it extends forwardly through an opening 36 in the outer casing. The window B in the housing closure 14 registers with the mouth of the chute 35.

The cups C are carried by a basket or receptacle 40, which is rotatably mounted in the chamber 20a (Figs. 5 and 6). The basket is provided with upper and lower pintles 41 and 42, the latter pintle being received in bearing brackets 43, 44, which overlie the central passage 30a of the chamber 20a and are secured to the plate 23. The upper pintle 41 is received in a central bearing 45 of a circular auxiliary cover 46, which cover is positioned in a shouldered portion 47 of the previously described plate 21.

The basket 40 is a fabricated structure consisting of an annular base plate 49, which constitutes the bottom of a plurality of radially spaced cup magazines 50. The magazines are each formed of six lengths of radially spaced vertical wires 48 and 51, which are held in such spaced relation by two series of surrounding rings 52 to which the wires are welded. The rings, in turn, are welded to each other, as indicated at 53 (Fig. 6) to form an annular arrangement of magazines. Four of the wires 48 of each magazine are secured to the base plate 49, as indicated by the numeral 55 (Fig. 5). The rings 52 are connected to hub portions 41a, 42a of the pintles 41 and 42 by radiating wire spokes 56, which spokes are welded thereto to provide a rigid structure.

Each magazine 50 is provided with an inwardly facing aperture 57 (Fig. 7) at its bottom, to permit the lowermost cup to be discharged toward the center of the storage chamber 20a by mechanism which will be described presently. The aperture 57 is defined at its upper end by a bent U portion 58 which connects the lengths of wire 51. Angular pieces of wire 61 are disposed radially between the lower portions of the magazines, and they serve as side guides, as will be described later.

A ring 62 is welded to the exterior of the basket 40 near the top thereof, and it is formed with spaced bent sections constituting cam portions 63 (Fig. 6), a cam portion being provided for each magazine 50. On an adjacent portion of the inner wall of the casing 20, a spring-pressed follower 65 is mounted for hinging movement, and it is supplied with a cam roller 66 which is adapted to engage the circular cam ring 62. An electric index switch 67 is mounted in the casing 20 in a position where its switch button 67a may be engaged and depressed by the follower 65 whenever the cam roller may be engaged by the circular portions of the ring 62. Whenever the switch button 67a is released by the entry of the cam roller 66 in one of the cam portions 63, the circuit is closed. This device provides a safety index feature controlling the motive elements of the machine, which elements will now be described.

Figures 11, 12:
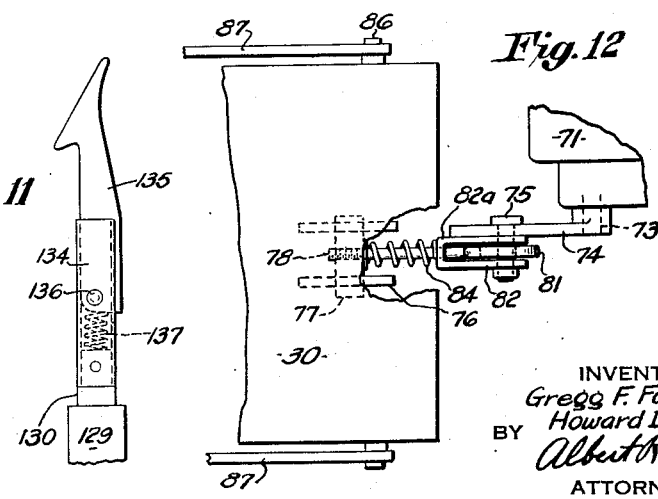
Fig. 11 is a top view of the inner end of the rotating plunger, illustrating particularly the pawl structure.
Fig. 12 is a detail top view of the crank drive.

The motive element of the machine consists of an electric motor 70 (Fig. 5) and an adjoining gear reducer unit 71, which are carried by a common bracket 72, suspended from the plate 24. The final shaft 73 of the unit 71 carries a crank arm 74 having a crank pin 75 affixed thereto. The adjacent door 30 is provided with a bearing bracket 76 in which a stud 77 is rotatably mounted. A connecting rod 78 is secured laterally through the stud 77, and its free extremity is formed with a slot portion 81 which is slidably mounted on the crank pin 75. A keeper plate 82 is also rotatably carried by the pin 75, and it is provided with a spaced bearing portion 82a in which the shank of the connecting rod 78 is slidably mounted (Fig. 12). A compression spring 84 is disposed about the connecting rod 78 and it is retained between the stud 77 and the portion 82a of the keeper plate 82. It will be apparent from a consideration of this structure, that the door 30 will be closed by the action of the power-driven linkage before the crank pin 75 reaches its dead center position, and that any further movement of the crank pin toward dead center position will simply further compress the spring 84. Thus, should the timing of the starting or stopping of the motor be slightly inaccurate, this mechanism will accommodate itself to a considerable degree of error, to assure the tight closing of the door and the corresponding prevention of loss of cold air from the storage chamber 20a during inoperative periods of the machine.

The sides of the door 30 are provided with studs 86 (Fig. 5) which carry the ends of a pair of connecting rods 87. The rods 87 extend forwardly through front opening 36 in the outer casing 11, and their front ends carry studs 88 which are secured to an inverted U-shaped yoke 90 (Fig. 4). The lower terminals 90a of the yoke are rotatably carried on studs 91 which are in turn secured in lugs 92 on the casing 11. It will be apparent that upon operation of the motor 70, the yoke 90 will be caused to reciprocate toward and away from the casing 11, and simultaneously the door 30 will open and then close.

The yoke 90 actuates a plurality of operating and control instrumentalities for, first, expelling a cup from one of the magazines 50; second, rotating the basket 40 to present a new magazine to the mechanism; third, feeding a spoon from a supply magazine; and fourth, effecting the stoppage of the motor 70 upon the completion of one cycle of operation of the drive mechanism.

The cup expelling elements (Fig. 7) are associated with two tubular guide sleeves 94, 95, which extend radially into the chamber 20a through the inner and outer casings 20 and 11. The sleeves are formed with grooves 96 at their projecting extremities, for receiving forked clips 97, which clips serve to secure the sleeves against axial displacement from the casing 11. The lower sleeve 95 slidably receives a plunger 100, comprising a tube 98 having a solid tip 99 affixed to its inner end. A tension spring 101 is disposed within the tube 98, and one extremity thereof is secured to a pin 102 in the tip 99, while the remaining extremity is held by an eye member 103. The eye member is carried in a bracket 104 which is secured to the outer casing 11, and which is bifurcated so that the tube 98 in its withdrawn position may move between the bifurcated portions 104a and contact a bumper 105 on the outer end of the bracket.

A latch 106 is secured to the tube 98, and its upper and lower ends are formed with a knuckle portion 107 and an inclined cam surface 108, respectively. The lower end of a lever 110 is carried in the knuckle portion 107 by a pivot stud 111, while the upper end of such lever is provided with a stud 112 which slidably engages in a slot 113 (Fig. 5) of a bracket 114.

The yoke 90 carries a bracket 115 (Fig. 4) having spaced slotted arms 116. A pin 117 is disposed transversely through the arms 116 and its projecting ends are secured in guide members 118 whose lower ends are slidably engaged through suitable holes in the yoke. Compression springs 120, about the members 118, tend to retain the pin 117 in its uppermost position in the bracket 115.

As will be seen in Figs. 5 and 7, the latch 106 of the plunger 100 is engaged by the pin 117 during the right hand movement of the yoke 90. When the yoke approaches the end of its right hand or active stroke, the pin 117 engages inclined cams 121 on the lower sides of the bifurcated portions 104a of the bracket 104. The pin 117 is thus depressed and moved out of driving position with the latch 106, and accordingly the plunger assembly is immediately released for return movement independently of the yoke under the urge of the tension spring 101.

The lever 110, which is moved by the latch 106, carries a plunger actuating member 123, which is secured thereto by a pivot stud 127. The free extremity of the member 123 is slidably entered in a tube 124 of a plunger 125, which in turn is slidably mounted in the described tubular guide sleeve 94. The member 123 is formed with bent terminals 123a which are adapted to engage lugs 124a on the tube 124 when the lever 110 is moved to the left. The free end of the tube 124 is supplied with a tip 125a which serves as a support for a compression spring 126 disposed within the tube 124. It will be observed that when the lever 110 is moved to the right, the accompanying actuating member 123 engages the spring 126, which serves as a coupling between the member 123 and the plunger 125, to the end that the plunger is moved with the actuating member until the plunger engages a cup C. When this occurs, movement of the plunger substantially ceases, and the spring 126 is simply further compressed within the tube 124 for the balance of the right hand stroke of the mechanism.

It will be noted that the sleeves 94 and 95 and the plunger tips 99 and 125a are formed of a heat insulating material, in order to prevent thermal communication between the inner and outer casings.

Assuming that one of the magazines 50 of the basket 40 is positioned in radial alignment with the plungers 100 and 125 (Fig. 7), then it will be seen that upon the active stroke of the mechanism, the upper plunger 125 will first resiliently engage the side of the second cup C in the magazine. Immediately thereafter, the plunger 100 engages the lower portion of the bottom cup, and expels such cup through the magazine aperture 57, whence it drops through the central passage 30a, past the open door 30, and then into the delivery chute 35.

In dispending cups having a deeply recessed top C', whereon the overlying cup is stacked, it is important that the lower cup be ejected in such manner that violent physical action between the cups is avoided. In the present machine, it will be observed that upon the initial movement of the plungers, the two lower cups are free to tilt first to a nearly aligned angular position (dotted lines, Fig. 7) limited by the contact of the upper cup with the bent U portion 58 of the magazine 50. Further movement of the plunger 100 then causes the bottom cup to be rotated about a pivot provided by the right hand corner of the overlying cup. This permits ejection of the lower cup without subjecting its upper rim to severe stresses, in a combined sliding and tilting action, wherein, in effect, the lower two cups are first moved angularly out of axial alignment with the remaining cups in the magazine in preparation for the final expelling movement of the plunger 100.

During this movement, the plunger 125 is free to accommodate itself to the angular positioning of the second cup, since such plunger is resiliently propelled rather than positively driven, as is the lower plunger 100. Similarly, during the return movement of the plungers, the upper plunger 125 retains its pressure on its cup and holds the column of cups suspended until the lower plunger 100 clears the annular base plate 49. At such time, the terminals 123a of the actuating member 123 positively engage the lugs 124a of the plunger tube 124, and the plunger 125 is thus withdrawn and the column of cups released for a gravity fall onto the plate 49.

After the rapid withdrawal action of the plungers, the yoke 90 enters upon its return stroke, during which the basket 40 is caused to rotate to a position where the next magazine 50 is opposed to the plungers. The rotating mechanism consists of a fixed sleeve 129 which extends through the casings 20 and 11, and which is spaced laterally from the described sleeves 94, 95. The sleeve 129 slidably receives a plunger tube 130, whose outer end is connected to a bearing bracket 132 on the yoke 90 by a link 133. The inner end of the plunger tube 130 carries a slotted tubular tip 134 to which a pawl 135 is attached by a pivot pin 136. The pawl 135 is normally held against the wall of the tip 134 by a contacting spring 137 carried within the tip. The bottom plate 49 of the basket 40 is provided with depending radially spaced pins 140 (Fig. 5), the number of pins being equal to the number of magazines 50. When the yoke 90 begins its active stroke, the plunger tube 130 and accompanying pawl 135 is thrust into the chamber 20a, and the pawl finally engages over one of the pins 140. Upon the return stroke of the yoke, the basket 40 is thus rotated one-eighth of a revolution, and a new magazine is accordingly presented to the remaining plungers. Attention is again directed to the cam ring 62 on the basket 40, and to the electric switch 67, which is closed when the basket is rotated to a proper dispensing position.

It is proposed to dispense a spoon S upon each cycle of operation of the machine, so the customer may be presented simultaneously with both a spoon and a cup, which are available through the windows A and B, respectively, of the closure 14. A spoon magazine 150 (Fig. 8) is fastened to the outer casing 11, and its open front is supplied with a cover 149. A leaf spring 151 on the top wall of the magazine prevents accidental displacement of the cover, and also it permits the cover to be moved vertically a slight distance. The lower end of the cover 149 and magazine 150 are formed with overlying lugs 149a, 150a, respectively. The latter lugs are pierced to receive a transverse bar 152, which bar projects through slots 149b in the cover lugs 149a. The bar 152 and the rear wall 153 of the magazine carry longitudinal bars 152a on which the supply of spoons is supported. A weight W is positioned on the stack of spoons S to insure correct feeding thereof.

The spoons are dispensed by a picker 155, which is secured to the top of the yoke 90. The picker is formed with an upstanding shouldered portion 156 which, during the active stroke of the yoke, passes beneath the spoon magazine 150 to the position indicated in dotted lines in Fig. 8. On the return stroke of the yoke, the portion 156 engages a spoon S and thrusts it forward past a curved lip 157 on the cover 149, and partially through the closure window A.

Failure to remove a spoon from the machine will not cause damage on the next cycle, since upon the dispensing of another spoon the cover 149 is lifted to permit the passage of two spoons beneath the lip 157.

The starting device for the electric motor is a switch device (Fig. 9), which in the present instance is coin-controlled. This device is fed by a slug rejector and coin return unit 161, of a type which is well known in the art, and for the present purposes of description it will suffice to say that it is provided with a coin inlet 162 into which the customer inserts a coin through a coin slot D in the closure 14. The device is also provided with a coin return pocket 163 which is accessible through a window E in the closure 14.

When an acceptable coin passes through the unit 161, it drops into a slot 164 in a housing 160, and between two spring contact fingers 165 disposed on opposite sides of the housing 160 and entering the housing through slots 166. As will presently be more fully described, the coin completes a circuit to cause the motor-driven yoke 90 to start on its active stroke.

The housing 160 is formed with a horizontal slideway 167 in which a plunger 168 of insulating material is mounted for reciprocating movement. The plunger is connected to a drive arm 170 on the exterior of the housing by a stud 171. The stud extends through a slot 172 in the housing. A tension spring 173, extending from the housing to the drive arm, normally retains the arm 170 and accompanying plunger 168 in its forward or retracted position. The rear portion of the arm 170 carries a stud 174 which is slidably guided in a slot 175 in the housing.

During the active stroke of the yoke 90, it strikes the drive arm 170 and forces it rearward. This action is accompanied by the plunger 168 engaging and moving the coin over the open bottom 167a of the slideway 167, through which the coin drops into an underlying coin box 176.

Upon the completion of a single cycle of operation of the mechanism, the motor circuit is broken by a switch 180 which is carried by a bracket 181 on the casing 11 (Fig. 7). The yoke 90 is supplied with a depending cam finger 90b, which engages and depresses the switch button 180a when the yoke is in its forward position (Fig. 5). This breaks the motor circuit, and the mechanism comes to a rest, preparatory to a succeeding coin-controlled operation.

It will be noted that when the coin is inserted to complete the motor circuit, the switch 180 is in its "off" position, and then, when the yoke starts to move, the switch button 180a is immediately released to close its circuit. Thus, when the coin is subsequently driven out from between the contact fingers 165, the coin-controlled circuit is opened, but the motor circuit actually stays closed until the switch button 180a is again depressed. This will be better understood by reference to the electric circuit diagram (Fig. 10), where it will be seen that the contact fingers 165 and the switch 180 are disposed in parallel in one branch 181 of the motor circuit. It will also be noted that the index switch 67 is disposed in series with the contact fingers 165. Thus, should the magazine basket 40 be improperly positioned, the switch 67 will remain open, and it will be impossible to start the motor through the coin control until the defect causing this condition is corrected.

In the operation of the machine, the magazine 50 may be filled with cups C containing ice cream or the like, by opening the top cover 13, removing cover 185a, and dropping the cups through a hole 185 in the auxiliary cover 46. The basket 40 may be rotated by hand to present successive magazines to the hole 185 for the loading operation. During subsequent use of the machine, the cups and spoons are ejected automatically, and after each dispensing operation the magazine basket 40 is rotated to present an adjacent magazine for the next operation, as previously described. It will be obvious, from these considerations, that all the magazines will be emptied at a uniform rate.

When the supply of cups is so depleted that only a single cup remains in each magazine, the mechanism is so devised that after the next individual operation, all coins inserted in the machine are returned, thus apprizing the owner of the machine that refilling of the magazines is necessary. This device consists of a lever 190 (Fig. 4) having an angular slot 187, which receives a pivot stud 188 secured in a bracket 189. A light tension spring 186 is connected between the bracket 189 and the left hand end of the lever 190, and such spring urges the opposite end of the lever into contact with the projecting tube 124 of the plunger 125 (see Fig. 7) and at the same time the spring lifts the lever so that the lower extremity of the slot 187 engages the stud 188.

When the mechanism is operated for the last time before refilling is necessary, the plunger 125 meets no opposition on its inward thrust, and as a result it will be thrust completely into the guide sleeve 94 under the urge of the spring 126. The end of the lever 190 will thus be momentarily deprived of support, and it will be swung on its pivot to a position below the plunger tube 124. A rod 191 is carried by the left hand end of the lever 190, and it is connected, as indicated by the numeral 192, to a coin diverting device 193 on the slug rejector unit 161.

When the magazines are refilled, it is necessary to thrust the rod downwardly to reset the lever 190 to its first position. In this case, the slot and stud connection of the lever permits the lever end to be swung past the tube 124 without binding.

It will now be apparent that when the machine is properly loaded and conditioned for service, it will deliver a cup and spoon automatically upon each insertion of a coin, and will continue to do so until the supply of cups is nearly exhausted. When a cycle of operation is initiated by dropping a coin in the slot D, the gear unit 71 is immediately set in motion to open the door 30 and to draw the yoke 90 inward on its active stroke to expel a cup C which falls through the door opening 30a for delivery to the customer. Upon the return stroke of the yoke, the door 30 is closed to prevent the escape of cold air from the cold storage chamber 20a, and simultaneously with this movement a spoon is ejected from the spoon magazine 150, and the cup basket 40 is rotated to position a new magazine 50 for a subsequent dispensing operation. At the end of the return stroke, the yoke causes the button 180a of the switch 180 to be depressed to open the motor circuit and to stop the mechanism in its initial position (Fig. 5).

It is not intended that the invention be limited to use with the type of cups herein shown, as it will be obvious that the dispensing principle may be as easily adapted to other forms of packaged comestibles. By the same token, those skilled in the art will recognize the possibility of substituting other mechanical and electrical elements and instrumentalities for those herein set forth, without departing from the inventive concept as defined in the following claims.

We claim:

1. In a vending machine for packaged comestibles, a cabinet having a vertically disposed cold storage chamber therein, said chamber having a central opening in the bottom thereof, an outwardly opening door sealing the opening in the chamber, a receptacle in the chamber having a plurality of circularly spaced magazines disposed on its periphery, each magazine adapted to receive a stack of superimposed packages, each magazine being formed at its bottom with an aperture which faces inwardly relative to the axis of the receptacle, means supporting said receptacle for rotary movement in the chamber, motor operated reciprocatory means for opening and closing said door, plunger means extending through said cabinet and adapted to engage the lowermost of the packages in one of the magazines, means connecting the plunger for operation by and during operation of said reciprocatory means to cause the ejection of the lowermost package through the magazine aperture and gravity discharge thereof through said central opening, means operating in timed relation to said last named means for subsequently rotating said receptacle to present a new magazine to the plunger, and control means for enforcing the stoppage of said reciprocatory means at the end of each cycle of operation thereof.

2. In a vending machine for packaged comestibles, a cabinet having a vertically disposed cylindrical cold storage chamber therein, said chamber having a central opening in the bottom thereof, an outwardly opening door sealing the opening in the chamber, a receptacle rotatably mounted in the chamber and having a plurality of circularly spaced magazines disposed on its periphery, each magazine being adapted to receive a stack of superimposed packages, each magazine being formed at its bottom with an aperture which faces inwardly relative to the axis of the receptacle, a package dispensing mechanism organized to eject the lowermost package from a magazine through said magazine aperture for gravity delivery through the central opening of the chamber, said mechanism being also connected for opening said door, and means operated by the mechanism for rotating said receptacle subsequent to the ejecting operation.

3. In a vending machine for packaged comestibles, a cabinet having a cold storage chamber therein, said chamber having a central opening in the bottom thereof, a movable door sealing the opening in the chamber, magazine means in the chamber for supporting a plurality of superimposed packages, ejector means extending through the side of the cabinet and adapted to engage the lowermost of the packages and to thrust the package from the magazine for gravity delivery through the chamber opening, drive means for periodically opening and closing the door, a mechanical connection between the drive means and the ejector means whereby the ejector means is operated in timed relation to the opening of the door, and control means for the operation of the drive means for enforcing stoppage thereof at the end of each cycle of operation.

4. In a vending machine for packaged comestibles, a cabinet having a cold storage chamber therein, said chamber having an opening in the bottom thereof, a hinged downwardly opening door sealing the opening in the chamber, magazine means in the chamber for supporting a plurality of superimposed packages, motor operated crank means, a connection between the crank means and the door whereby the door may be periodically opened, a yoke member on the exterior of the cabinet, means connecting the yoke member for reciprocatory movement by the crank means, bearing means extending through the cabinet and into the chamber, ejector means slidably carried in the bearing means and adapted to engage and thrust the lowermost package from the magazine and into the chamber opening, a releasable latch connection between the yoke and ejector means, cam means for disengaging the latch connection at the end of the thrusting movement of the ejector means, spring means for rapidly withdrawing the ejector means, and control means for the crank means for enforcing stoppage thereof at the end of each cycle of operation thereof.

5. In a vending machine for packaged comestibles, a cabinet having a cold storage chamber therein, said chamber having an opening in the bottom thereof, a hinged downwardly opening door sealing the chamber opening, magazine means in the chamber for supporting a plurality of superimposed packages, motor operated crank means, a link connecting the door to the crank means, said link having a lost motion connection with the crank, resilient means for taking up the lost motion of said connection, a package dispensing mechanism operated by the crank means including an ejector for thrusting a package from the magazine for gravity delivery through the chamber opening, and control means for the motor operated crank means for enforcing stoppage thereof at the end of each cycle of operation.

6. In a vending machine for packaged comestibles, a magazine for receiving a stack of superimposed packages, said magazine having a side opening at the bottom thereof, a dispensing mechanism comprising a pair of bearing sleeves disposed laterally of the magazine, an ejector slidably mounted in each sleeve, drive means for moving the ejectors toward the magazine, the lower of said ejectors being adapted to engage the bottom package and force it through the magazine opening, the upper ejector being formed with a compressible extremity for engaging the next package and retaining it in frictional engagement with the walls of the magazine, and means for withdrawing the ejectors, said upper ejector being connected to said withdrawing means for return action after said first ejector is completely withdrawn from the magazine.

7. In a vending machine for packaged comestibles wherein the packages are in the form of cups having recessed covers, a cylindrical magazine for receiving a stack of cups disposed in partly telescoped relation, said magazine having a side opening at the bottom thereof and an overlying outwardly relieved portion, a dispensing mechanism comprising an ejector adapted to engage the bottom cup, cooperating resilient means for engaging the side of the overlying cup, drive means for moving the ejector and resilient means into contact with their respective two bottom cups, whereupon the two bottom cups are first tilted angularly with respect to the axis of the magazine with the said overlying cup finally engaging said relieved portion to permit the lower cup to be rotated out of engagement therewith and to be expelled through said opening.

8. In a vending machine for packaged comestibles, a magazine for receiving a stack of superimposed packages, said magazine having a side opening at the bottom thereof, a dispensing mechanism comprising a pair of sleeve bearings disposed laterally of the magazine, an ejector slidably mounted in each sleeve, the lower of said ejectors being adapted to engage and eject the bottom package, the upper ejector being formed with a compressible extremity for engaging the next package and retaining it in frictional engagement with the magazine, motor driven actuating means for reciprocating the ejectors in their bearings, control means for the actuating means including starting switch means, lever means retained in a fixed position by and during normal operation of the compressible extremity of the upper ejector, means operable by movement of the lever for preventing operation of the switch means, said lever being movable from its fixed position when said compressible extremity of the upper ejector fails to engage a package in the magazine.

9. In a vending machine for packaged comestibles, a cabinet having a cold storage chamber, a receptacle mounted for rotation on a vertical axis in the chamber and having a plurality of circularly spaced magazines on its periphery, each magazine being adapted to receive a plurality of superimposed packages, a motor driven dispensing mechanism organized to eject the lower-most package from one of the magazines, means operated by the mechanism for subsequently rotating the receptacle to present a new magazine to the mechanism, control means for the mechanism including a cam disposed on the receptacle adjacent each magazine and a cam follower operated switch in the storage chamber, said switch being operable by the cam to permit operation of the mechanism only when a magazine is properly rotated to a dispensing position relative to said mechanism.

10. In a vending machine for packaged comestibles, a motor driven dispensing mechanism including reciprocable means, a control system for the motor of the dispensing mechanism including a coin controlled starting switch, said reciprocable means being organized to open said switch after starting of the motor is initiated, a second switch in parallel with said coin controlled switch, said reciprocable means being adapted to close the second switch upon initial movement and to open the same switch at the end of a cycle of reciprocation.

11. In a machine for vending packaged comestibles, a cabinet including an inner insulated storage compartment, an opening formed in the bottom of the compartment, a cylindrical package holding magazine rotatably mounted in the compartment around said opening, a spring-retracted plunger positioned through the wall of the cabinet and adapted upon movement within the cabinet to eject a package from the magazine through said opening, means for moving said plunger into the compartment, latch means for releasing said plunger from said moving means after said plunger has moved a predetermined distance, whereby the plunger is quickly retracted, pins disposed on the lower portion of the magazine, a pawl member extending through said cabinet and adapted to engage said pins, said pawl member being connected to said plunger moving means, whereby, upon return movement of said plunger moving means the magazine may be rotated after said plunger has been retracted.

12. In a machine for vending packaged comestibles, and of a type including a storage compartment and operating mechanism, a cabinet for said comestibles and mechanism comprising, an upright external wall, a substantially cylindrical wall disposed within said external wall in spaced relation with respect thereto, the space between said walls providing a zone of low heat conductivity, an exterior removable cover disposed above both the external and cylindrical walls, a second interior cover disposed within the removable cover above the cylindrical wall to seal the end thereof, a filling opening formed in said second cover adjacent the marginal portion thereof, bottom plates disposed in spaced relation at the lower end of said cylindrical wall and transversely of said external wall, thereby to define within the cylindrical wall a storage compartment, aligned apertures formed in said bottom plates at the centers thereof, a sleeve connecting said apertures, a work compartment formed within said external wall below said storage compartment, a delivery chute extending downwardly from said sleeve into said work compartment and laterally thereof to and through the external wall, a closure door disposed on said sleeve, and mechanism mounted both within the work compartment and on the external wall for opening said door and ejecting a package from the storage compartment through the sleeve and into the chute.

13. In a machine for vending packaged comestibles, a cabinet having a refrigerated storage compartment formed with an open top, an interior removable cover plate interfitting with and sealing the open top of the compartment, a receptacle rotatably mounted in the compartment and removable through the open top when the interior cover is removed, an exterior cover positioned over the top of the cabinet to enclose the compartment and the interior removable cover thereon, said exterior cover also being movable to expose said interior cover, said receptacle having a plurality of vertically disposed and circumferentially spaced package receiving magazines, said interior cover being formed with an off-center filling opening registering with one of the underlying magazines, said opening being only slightly larger than the packages to be inserted in order to minimize the transfer of warm air and water vapor into the storage compartment during a magazine loading operation, a discharge opening formed at the bottom of the compartment, and dispensing mechanism for entering the compartment and removing packages contained in the magazines extending into said cabinet at the bottom thereof.

GREGG F. FORSTHOEFEL.
HOWARD D. WHITE.